United States Patent [19]

Rainer

[11] Patent Number: 5,678,669
[45] Date of Patent: Oct. 21, 1997

[54] FRICTION CLUTCH UNIT

[75] Inventor: Bruno Rainer, Gorizia, Italy

[73] Assignee: Carraro S.p.A., Campodarsego (PD), Italy

[21] Appl. No.: 502,260

[22] Filed: Jul. 13, 1995

[30] Foreign Application Priority Data

Aug. 3, 1994 [IT] Italy .................. PD94A0144

[51] Int. Cl.$^6$ .................................. F16D 21/06
[52] U.S. Cl. ............. 192/48.8; 192/70.3; 192/89.22; 192/99 A
[58] Field of Search .............. 192/48.8, 48.91, 192/70.3, 89.22, 99 A

[56] References Cited

U.S. PATENT DOCUMENTS

| | | | |
|---|---|---|---|
| 3,521,731 | 7/1970 | Labat | 192/70.3 X |
| 3,590,968 | 7/1971 | Binder | 192/48.8 X |
| 3,749,213 | 7/1973 | Maucher | 192/48.8 |
| 4,026,400 | 5/1977 | Rawlings | 192/99 A |
| 4,210,232 | 7/1980 | Beccaris | 192/48.8 |
| 4,465,170 | 8/1984 | Marchisio | 192/89.22 X |
| 5,513,734 | 5/1996 | Scotti | 192/70.3 X |

*Primary Examiner*—Rodney H. Bonck
*Attorney, Agent, or Firm*—Sughrue, Mion, Zinn, Macpeak & Seas

[57] ABSTRACT

The friction clutch unit described has two clutches, of which the second is normally disengaged. Each clutch comprises a clutch disc disposed coaxially between a pressure plate and a friction surface, the arrangement being such that the first and second pressure plates are both disposed between the clutch discs and a lever linkage for operating the second clutch acts on the corresponding pressure plate so as to move it away from the other pressure plate during the operative engagement of the respective clutch.

14 Claims, 5 Drawing Sheets

FRICTION CLUTCH UNIT

BACKGROUND OF THE INVENTION

The present invention relates to a friction clutch unit with first and second clutches provided with first and second lever linkages, respectively, for the separate engagement and disengagement of two separate driven members with the same driving member, each clutch comprising a clutch disc disposed coaxially between a pressure plate and a friction surface, the first and second lever linkages acting on the pressure plates of the first and second clutches, respectively, the second clutch being of the normally disengaged type with the corresponding pressure plate normally spaced axially from the respective clutch disc by a predetermined clearance.

Friction clutch units of the type indicated are used, in particular, although not exclusively, in the field of agricultural tractors, for the engagement of the transmission to the wheels and of the transmission to the power take-off shaft. For this purpose, known units are equipped with two separate clutches which control the two couplings indicated above independently.

According to the most widespread technique, known, for example, from the U.S. Pat. No. 4,465,170, the clutch which governs the engagement of the transmission to the power take-off shaft, the P.T.O. in brief, is of the normally engaged type, that is, a connection is normally established between the primary shaft or driving member and the secondary shaft or P.T.O. inside the machine unless the operator operates the lever linkage which controls the operation of the clutch, disengaging the connection. The transmission comprises a disengageable sleeve which allows the P.T.O. shaft to be disconnected outside the machine when it is not expected to be used.

For reasons of safety and of the practicality of the engagement operation, however, clutch units in which the clutch associated with the power take-off is normally disengaged have been investigated. In this case, in the event of breakage of the components of the control which governs the engagement of the clutch, the P.T.O. fails to engage or is disengaged, whereas previously it would have been engaged; the engagement of the drive to the P.T.O. shaft outside the machine is also facilitated, since the operator has to operate on a single control.

A first clutch unit formed in accordance with this teaching is known from the Applicant's current production. Although this unit fulfils expectations at a functional level, it has some disadvantages connected mainly with its axial bulk. In fact, in addition to the usual clutch bell-housing, which is generally produced by casting and carries one of the four friction surfaces required, it needs three movable elements each carrying a respective friction surface. Two of these elements are the respective pressure plates, whilst the third element is a kind of auxiliary bell-housing which is produced in a similar manner to the main bell-housing and which is abutted by a Belleville washer which constitutes the resilient load element of the two clutches. The pressure plate of the second clutch controlling the P.T.O. is positioned at the axially opposite end of the unit to the main bell-housing and thus in an outer position relative to the clutch discs; the auxiliary bell-housing is located in a position between the clutch discs, together with the first pressure plate.

During the engagement of the P.T.O., the second pressure plate is moved towards the first pressure plate so as to compress the corresponding clutch disc against the friction surface defined on the auxiliary bell-housing. The latter is lifted off the flywheel against the action of the resilient load applied by the main spring of the friction clutch unit. This spring thus acts as a load spring for both of the clutches.

With the unit indicated above, owing to its structural configuration, a suitable recess is preferably normally provided for housing the second pressure plate in the driving flywheel to which it is applied.

SUMMARY OF THE INVENTION

The problem upon which the present invention is based is that of providing a clutch unit which is less bulky axially and which, whilst being equipped with a normally disengaged clutch, can also be mounted on a flat flywheel without a recess for housing the second pressure plate, that is, a flywheel the same as those normally used for conventional clutch units with normally engaged clutches.

This problem is solved by the invention by means of a unit of the type mentioned above, characterized in that:—the first and second pressure plates are both disposed between the clutch discs, and—the lever linkage of the second clutch acts on the corresponding pressure plate so as to move it away from the other pressure plate during the operative engagement of the respective clutch.

According to the invention, an auxiliary bell-housing, preferably made of drawn sheet metal and thus of minimal axial dimensions, is introduced between the clutches. This auxiliary bell-housing is located between the first and second pressure plates and constitutes an abutment member for the main Belleville washer which is provided for exerting the resilient load for engaging the first clutch. The same bell-housing simultaneously constitutes a resilient support for a system of lever mechanisms which can bring about the engagement of the second pressure plate or, alternatively, a second resilient system is provided, instead of these lever mechanisms, for exerting the resilient load for engaging the second clutch.

BRIEF DESCRIPTION OF THE DRAWING

The characteristics and advantages of the invention will become clearer from the following detailed description of five preferred embodiments thereof described by way of non-limiting example, with reference to the appended drawings, in which.

DESCRIPTION OF THE PREFERRED EMBODIMENTS

Figure 1:
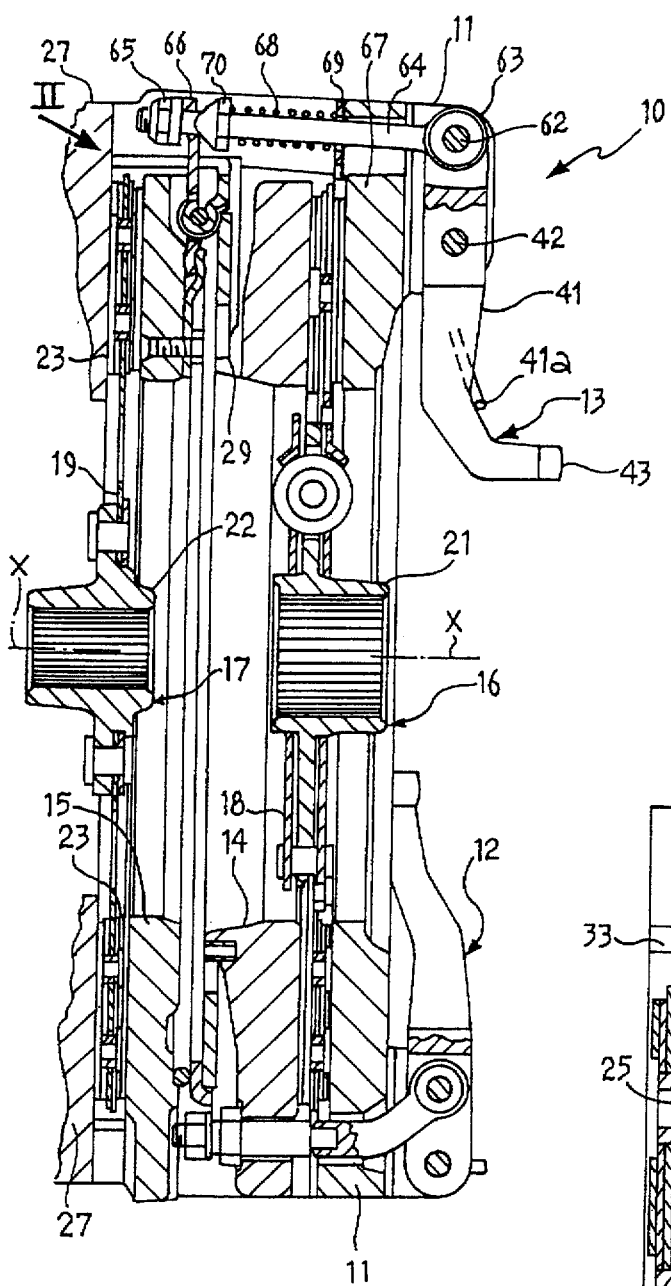
FIG. 1 is an axial section of a clutch unit formed according to a first embodiment of the invention.
Figure 2:
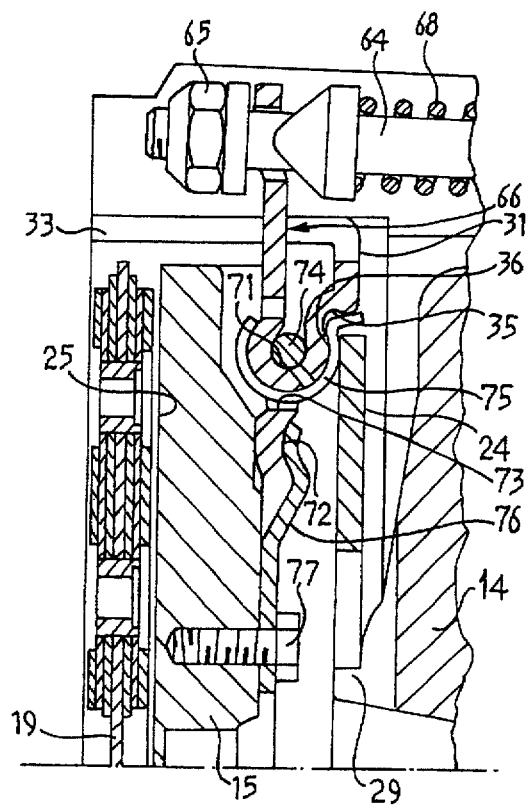
FIG. 2 is a section of the detail indicated by the arrow II of FIG. 1, on an enlarged scale.

With reference to the drawings indicated, the five embodiments of the clutch unit according to the present invention are indicated 10, 20, 30, 40 and 50, respectively, and each comprises a bell-housing 11 on which two sets of lever linkages 12, 13 are mounted for the operative control, respectively, of first and second pressure plates 14, 15 belonging to respective first and second clutches 16, 17 arranged coaxially on an axis X.

Each clutch 16, 17 also comprises a clutch disc 18, 19 bearing a central hub 21, 22 and, on its periphery, friction rings all indicated 23. The first clutch is of the normally engaged type, that is, in the absence of an operative control by means of the lever linkages 12, the friction rings 23 of the disc 18 are pressed between a friction surface 23a formed on the pressure plate 14 and a friction surface 23b formed on the bell-housing 11, as a result of the resilient load exerted by a Belleville washer 24. The second clutch 17 is of the normally disengaged type, that is, in the absence of an operative control by means of the lever linkage 13, the friction rings 23 of the disc 19 are spaced by a predetermined axial clearance from a friction surface 25 formed on the pressure plate 15 and from a friction surface 26 formed on a driving flywheel or other driving member 27 with which the clutch is associated and which is shown only schematically in the drawings.

The second clutch 17 therefore keeps the clutch disc 19 of the driving member 27 disconnected, preventing the transmission of torque to the hub 22.

Figure 11:
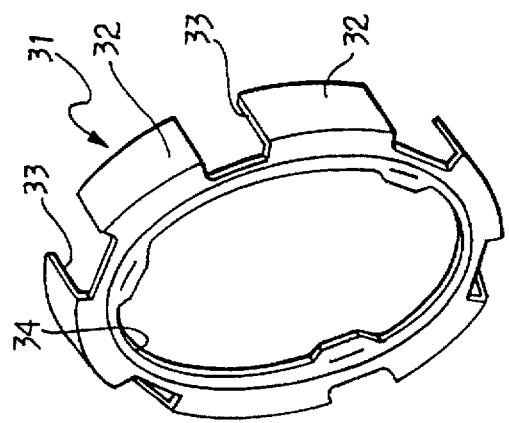
FIG. 11 is a perspective view of a detail of the embodiments of the preceding drawings.

The innermost annular band of the Belleville washer 24 bears against a step 29 in the first pressure plate 14 and its outermost annular band abuts a monolithic auxiliary bell-housing 31 which is made of drawn sheet metal and is thus of limited dimensions. This enables it to be located in a position between the two pressure plates 14, 15. With specific reference to FIG. 11, the auxiliary bell-housing 31 used in embodiments 10, 30, 40 and 50 has a cylindrical skirt 32 with circumferential gaps 33 both for reducing its weight and for the passage of the lever linkages 13 as will be explained further below, as well as a rim 34 in which there are two juxtaposed recesses 35, 36 facing the first and second pressure plates 14, 15, respectively. The washer 24 bears on the rim 34 near the recess 35, the skirt 32 in turn normally bears against the surface of the driving member 27 adjacent and outside the friction surface 26.

With reference to the embodiment of FIG. 1, the lever linkages 13 comprise a set of three first-class levers, all indicated 41, pivotable on the bell-housing 11 by means of pins 42 and carrying feet 43 to which a load directed parallel to the axis X is applied in conventional manner, for example, by means of thrust bearings, not shown, in order to bring about the engagement of the second clutch 17. A biasing spring 41a is associated with each lever 41.

The head 63 of a tie rod 64 is articulated to the opposite end of each lever to the foot 43, and its opposite end is connected to an auxiliary lever 66 in adjustable manner, by means of a nut 65. The tie rod 64 extends with ample radial clearance in a hole 67 in the bell-housing 11 and a spring 68 fitted thereon and abutting a washer 69 bearing on a shoulder of the hole 67 at one end and a push-rod 70 at the opposite end urges the auxiliary lever 66 towards a position in which the pressure plate 15 is disengaged, as described further below. The auxiliary lever 66 extends through the corresponding circumferential gap 33 in the auxiliary bell-housing 31 and bears two adjacent seats 71, 72 between which there is an opening 73. The seat 71 partially houses a portion of a ring 74 which is also partially housed in the recess 36 in the auxiliary bell-housing 31; the auxiliary lever is thus pivotable on the auxiliary bell-housing and is connected thereto by means of a resilient connection constituted by a spring 75 which surrounds both the auxiliary lever 66 and the rim of the auxiliary bell-housing 31 extending through the opening 73.

The opposite end of the auxiliary lever 66 to the tie rod 64 is held against the pressure plate 15 by a retaining spring 76 fixed to the pressure plate by means of a screw 77. It will be noted that the region in which the lever 66 presses on the pressure plate is approximately centred on the pressure plate, that is, the engagement pressure is exerted on the pressure plate 15 in a region intermediate its largest-diameter region and its smallest-diameter region. An improved application of the engagement load is thus achieved, and by virtue of this, the friction surface of the pressure plate 15 remains substantially flat even under load.

Figure 8:
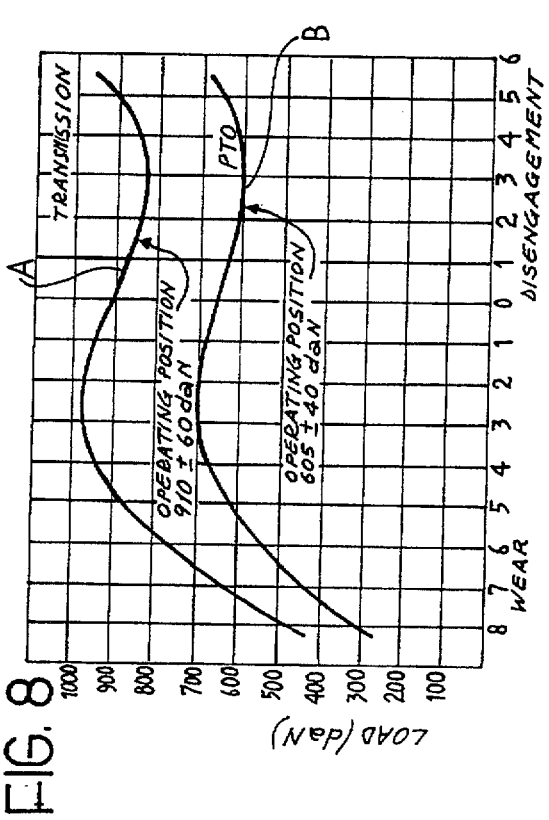

FIG. 8 shows the two characteristic curves of the washer 24 relating to the action performed in the first clutch (curve A) and in the second clutch (curve B). In the graph of FIG. 8, the loads developed by the washers in dependence on the normal engagement travel of the lever linkages controlling the corresponding pressure plate are shown on the ordinate, and the state of wear of the friction rings 23 is shown on the abscissa. Starting from a condition with newt and thus unworn, rings 23 (reference 0 for curve A and reference 2 for curve B in the graph), it can be seen that, even when the rings 23 are worn, in the portions which are of interest for the operation of the clutch unit, the curves A and B have points of inflection with almost horizontal shapes, that is, with little variation of the load developed by the washer 24 in comparison with the reference values.

To engage the second clutch 17, the feet 43 of the levers 41 are displaced to a predetermined extent, causing them to pivot correspondingly about the pin 42. A corresponding pivoting of the auxiliary lever 66 about the fulcrum constituted by the ring 74 is brought about by means of the tie rod 64, with a consequent movement of the second pressure plate 15 towards the clutch disc 17. When the second pressure plate 15 is in contact with and bearing on the clutch disc and this is in turn bearing on the flywheel 27, the auxiliary lever 66 is pivoted about its point of contact with the pressure plate 15, moving the auxiliary bell-housing 31 away from the friction surface 26 with a consequent compression of the Belleville washer 24. The lever-arm ratio of the lever linkage 13 is such that the load exerted on the second pressure plate 15 by the washer 24 is approximately equal to two thirds of the load exerted by the same washer 24 on the first pressure plate 14.

Figure 3:
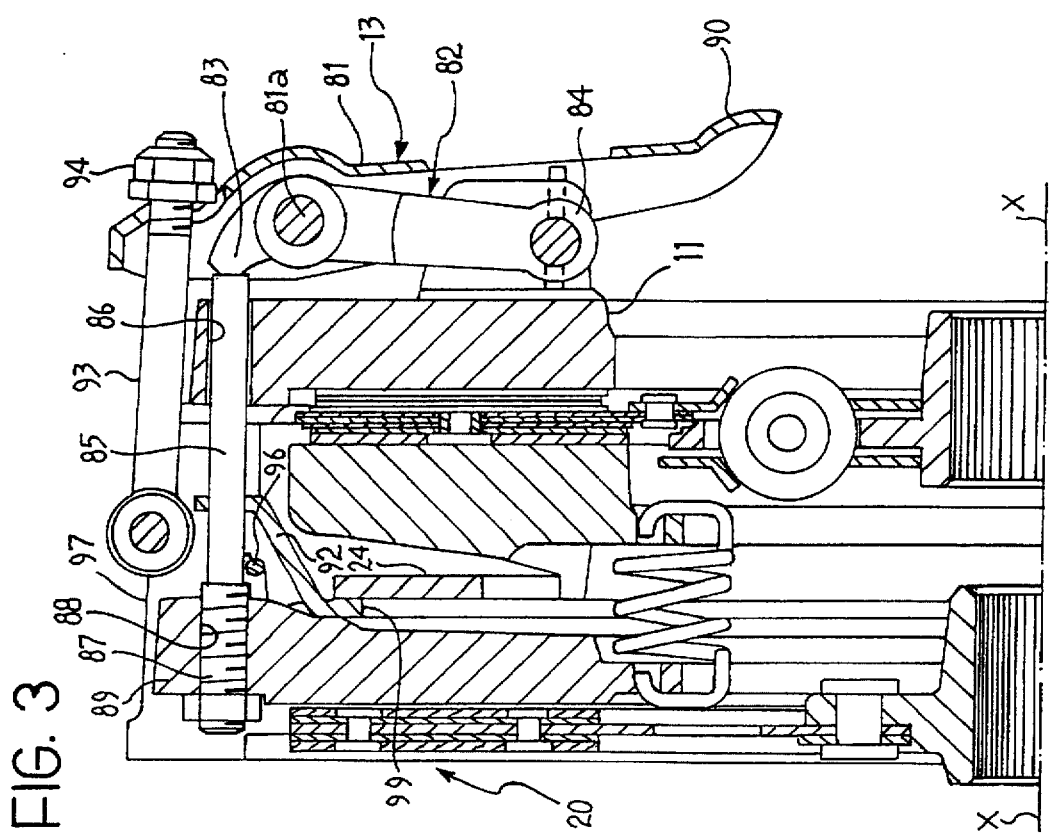
FIG. 3 is a partial axial section of a second embodiment of the invention.
Figure 5:
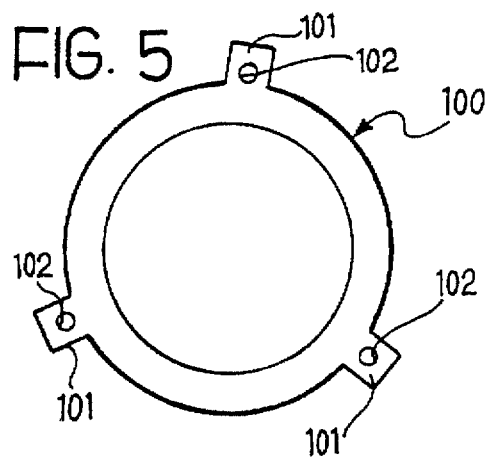
FIG. 5 is a plan view of a detail of the system of FIG. 4.

Another embodiment of the present invention is constituted by the unit 20 of FIG. 3. Details similar to those of the previous embodiment are identified by the same reference numerals.

The engagement of the second clutch is brought about by means of a strut system and the resilient load is derived from the main Belleville washer 24 by means of the lever linkage 13 which controls the second pressure plate 15 in the manner described below.

Each lever linkage 13 comprises a lever 81 pivotable on a pin 81a which in turn is fitted on a link 82 in a position intermediate two opposite ends 83, 84 thereof. The end 84 is articulated to the bell-housing 11, whereas the opposite end 83 is in contact with and bearing against the free end of a strut 85 guided for sliding in a hole 86 in the bell-housing 11. The opposite end 87 of the strut 85 is threaded and is engaged adjustably in a threaded hole 88 in a corresponding appendage 89 of the pressure plate 15. The adjustment serves to render the feet 90 of the levers 81 coplanar in the rest position.

The opposite ends of these levers to the feet 90 are connected to an auxiliary annular bell-housing 92 of drawn sheet metal by means of a respective tie rod 93, the length of which is adjustable by means of a nut 94. The auxiliary bell-housing 92 is in turn held and guided by a stop ring 96 restrained on studs 97 of the bell-housing 11 and an inner annular edge 99 thereof supports the Belleville washer 24. At rest, that is, when the second clutch is disengaged, the bell-housing 92 bears on the studs 97 by means of the stop ring 96.

If pressure is exerted on the feet 90 of the levers 81, these initially pivot on the nut 94 of the tie rod 93 causing the link 82 to pivot about the end 84. The corresponding displacement of the link results in an axial displacement of the strut 85 and of the pressure plate 15 until the axial clearance between the clutch disc 19 and the friction surfaces 25, 26 is eliminated. The pivoting of the link 82 about the end 84 is then stopped and further pressure on the feet 90 of the levers 81 causes the levers to pivot about the axis of the pin 81a.

As a result of this pivoting of each lever 81, the tie rod 93 is moved away from the auxiliary bell-housing 92 by the ring 96, resiliently deforming the washer 24. This causes a resilient load to be transmitted by the lever 81 and by the link 82 to the strut 85 and from there to the pressure plate 15.

To ensure that the second pressure plate 15 is detached from the clutch disc 19 and that the second clutch is consequently disengaged when the corresponding lever linkages 13 cease to be operated, a plurality of traction springs 60 act between the two pressure plates 14, 15. The springs 60 are inclined to the axis of the clutch unit, that is, they are engaged on the two pressure plates in angularly offset positions so that their resilient biasing action exerted on the pressure plates 14,15 has, in addition to an axial component for ensuring the aforementioned detachment, a component tangential to the pressure plates which is useful for taking up any radial play which may be the source of noise, vibrations, knocking and the like.

A characterizing aspect of both of the embodiments of the invention described above is that the Belleville washer 24 used as the resilient system for applying the resilient load to the pressure plate of the second clutch is the same one which is provided for the same function in relation to the first clutch. This solution achieves the undoubted advantage of a favourable shape of the characteristic curve of the spring, as is shown in the graph of FIG. 8, and of reduced axial dimensions. With the structure of embodiment indicated 20 in FIG. 3, if the lever arms of the lever linkages 13 are of suitable dimensions, it is possible to achieve a resilient engagement load for the second clutch such that the curve B of FIG. 8 is positioned close to the curve A, or even coincides therewith.

The embodiments of FIGS. 4 to 7, on the other hand have in common that a separate resilient system independent of the washer 24 is provided between the lever linkages 13 and the second pressure plate 15.

Figure 4:
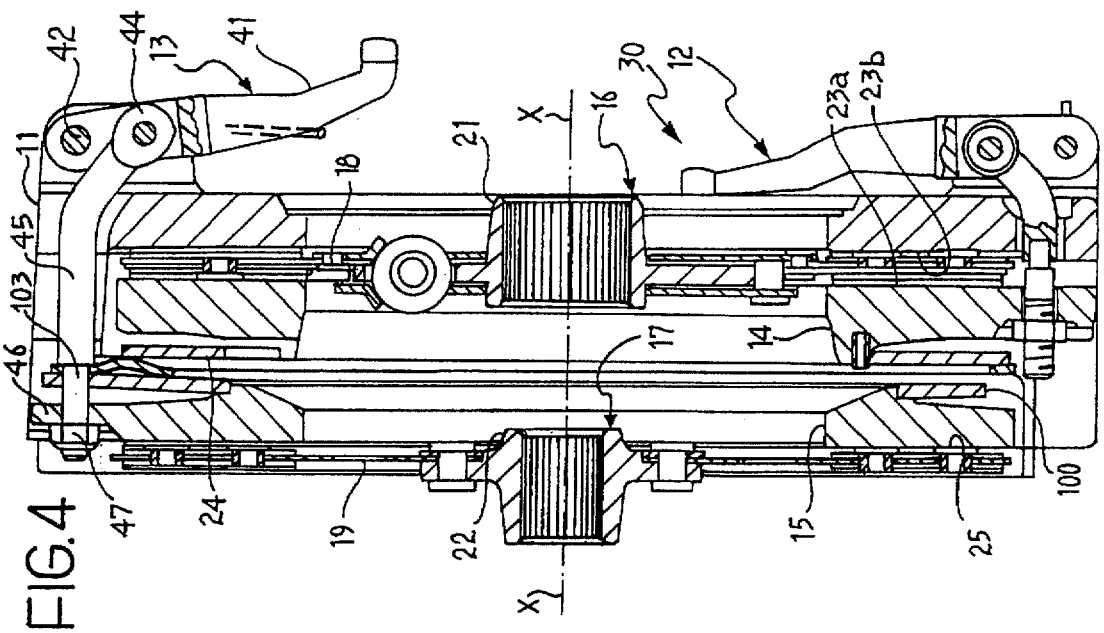
FIG. 4 is an axial section of a clutch unit formed according to a third embodiment of the invention.

With particular reference to the embodiment of FIG. 4, the lever linkages 13 comprise a set of three second-class levers, all indicated 41, pivotable on the bell-housing 11 by means of respective pins 42.

One end 44 of a strut 45 is articulated near the pin 42 and its opposite end is engaged in an appendage 46 extending radially outwardly from the second pressure plate 15; the connection between the strut 45 and the pressure plate 15 is rendered adjustable by means of a nut 47 to enable the rest positions of the levers 41 to be adjusted.

The resilient system acting on the pressure plate 15 is constituted by a Belleville washer 100 carrying three (or more) outwardly-extending radial appendages 101 each having a through-hole 102. The inside diameter of the washer 100 bears on a central region of the pressure plate 15 so as to maintain optimal flatness of the friction surface 25 even under load. Each of the struts 45 is engaged in a corresponding hole 102 and the struts 45 act on the washer 100 with the interposition of a rounded pusher-like shoulder 103.

Figure 9:
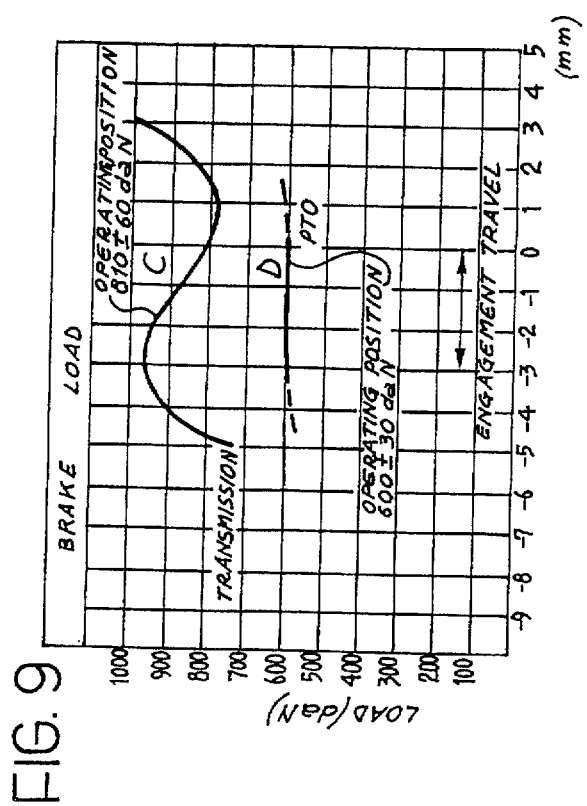

FIG. 9 shows the characteristic curves of the washers 24 (curve C) and 100 (curve D); it can be seen that, by virtue of the extreme linearity of the curve D, the resilient load which brings about the pressure on the disc 19 can be quite limited, even after the friction rings 23 have been worn within the permissible range of wear. It is consequently not necessary to provide a further large load to compensate for any reduction thereof as a result of the wear of the friction rings. The maximum torque which can be transmitted by the second clutch is consequently also constant.

There is also an appreciable margin of permissible wear of the friction rings.

Another advantage is that, as well as being substantially centred on the mean radius of the circular ring shape of the pressure plate, the load applied by the washer 100 to the pressure plate 15 is distributed uniformly throughout the region of contact between the washer 100 and the pressure plate 15. Moreover, this resilient load is not affected by the adjustments made to the rest positions of the levers 41 by means of the nuts 47.

Figure 6:
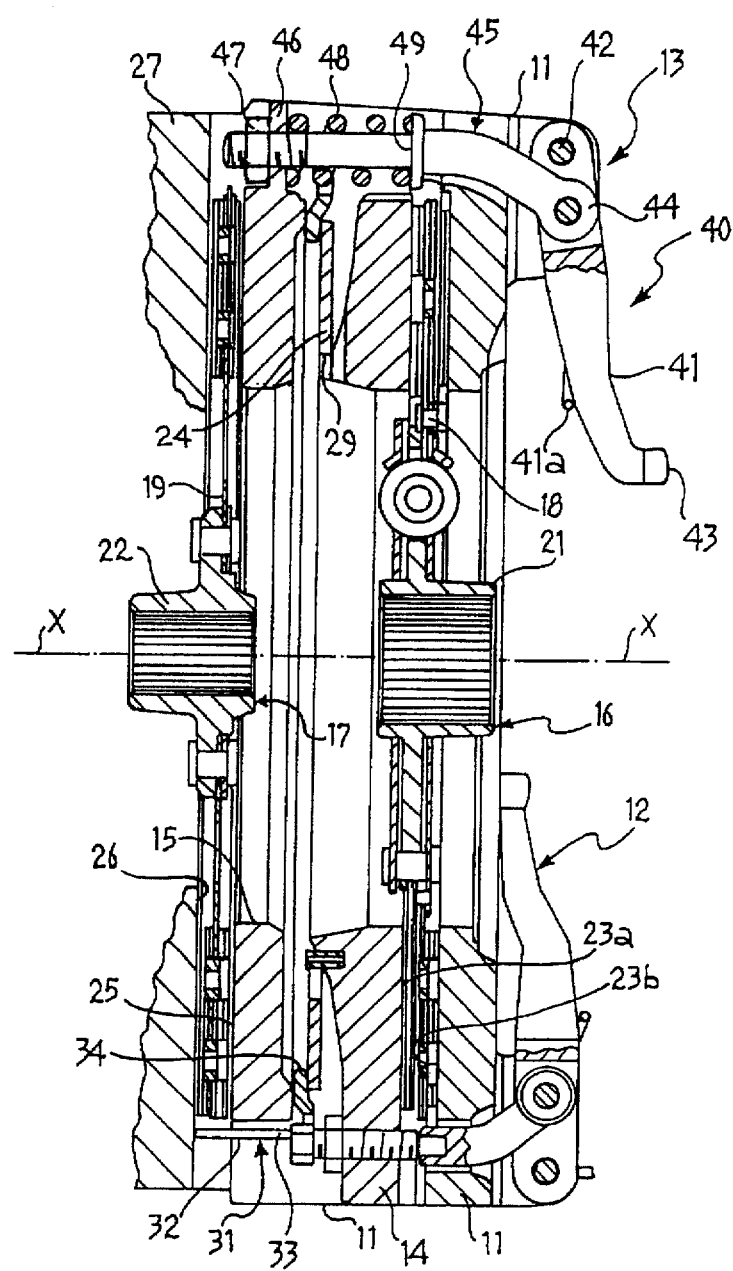
FIG. 6 is an axial section of a fourth embodiment of the invention.
Figure 7:
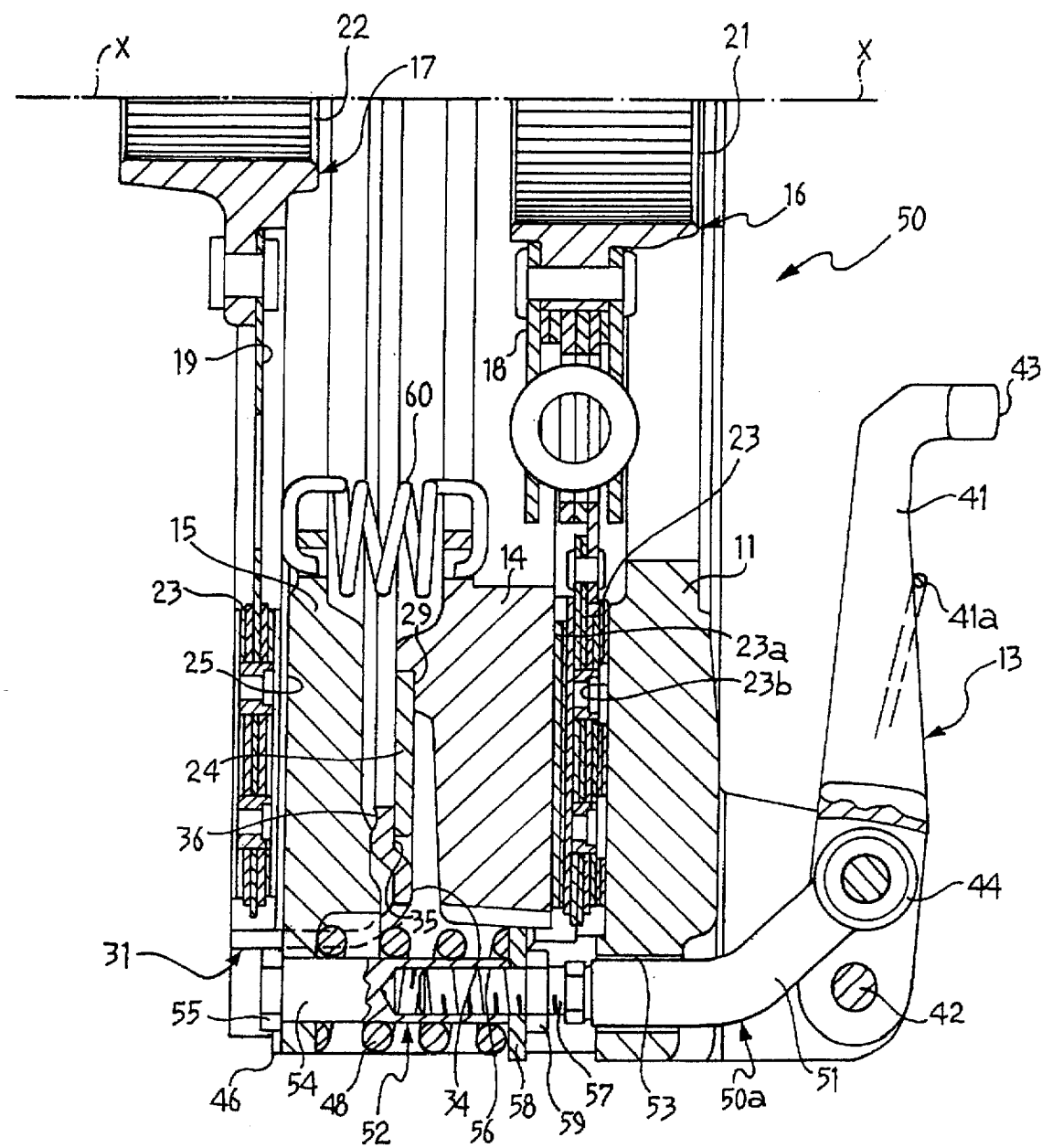
FIG. 7 is a partial axial section of a clutch unit formed according to a fifth embodiment of the invention.

With reference to the embodiment of FIG. 6, the resilient system for engaging the second clutch 17 comprises a helical spring 48 interposed between the appendage 46 of the pressure plate 15 and a shoulder 49 of each strut 45. The helical spring 48 may be replaced by a pack of Belleville washers. The resilient reaction of the springs 48 determines the resilient load exerted on the pressure plate 15 as a result of the operation of the levers 41 to engage the second clutch. It can be seen that the adjustment of the rest positions of the levers 41 by means of the nuts 47 affects the resilient preloading of each spring. This problem is avoided by the embodiment of FIG. 7 which differs from that just described in that the strut, generally indicated 50a, is formed in two parts 51, 52.

The part 51 carries the end 44 for articulation to the lever 41 and its opposite end is guided in a hole 53 in the bell-housing 11. The part 52 comprises a rod 54 with a head 55 in abutment against the appendage 46 and with an axial threaded hole 56 in which a screw 57 for adjusting the rest positions of the levers 41 is engaged. The axial preloading of the helical springs 48 is determined unequivocally since they are compressed between the appendage 46 and a washer 58 in abutment with the end of the rod 54 by a nut 59 screwed onto the threaded shank of the screw 57.

In order to engage the second clutch 17, the feet 43 of the levers 41 are displaced axially to a predetermined extent (the engagement travel) causing the levers to pivot about the pins 42. The struts 45, 50a first cause a displacement of the pressure plate 15 against the clutch disc 19 and subsequently a compression of the helical springs 48.

Figure 10:
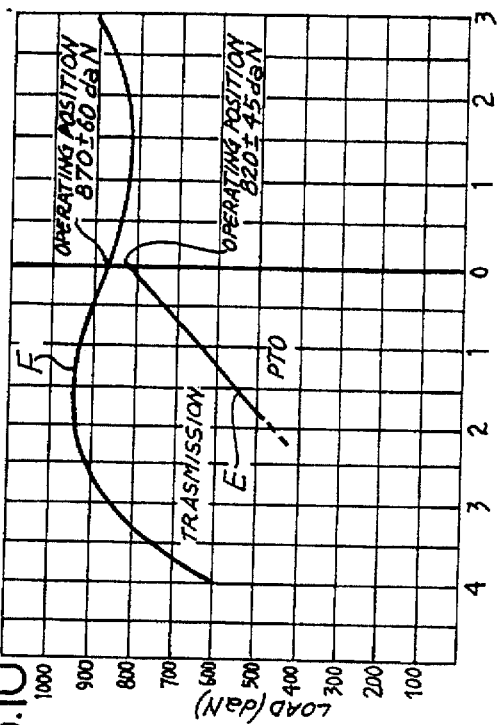
FIGS. 8 to 10 are graphs of the resilient systems corresponding to the embodiments of the preceding drawings.

Although both of the solutions of the embodiments described above are satisfactory from economic and functional points of view, they have the disadvantage that fairly stiff helical springs 48 the characteristic curve of which is shown schematically in FIG. 10 in which it is indicated by the letter E, are used for applying the resilient engagement load to the second pressure plate. Moreover, the thrust of the springs 48 is exerted on radially outer regions of the corresponding pressure plate with consequent possible deformation thereof under load.

With reference to FIG. 10, the characteristic curve of the Belleville washer 24 is indicated by the letter F; the load developed by the springs and the washer in dependence on the normal engagement travel of the lever linkage controlling the corresponding pressure plate is shown on the ordinate and the state of wear of the friction rings 23 is shown on the abscissa. Starting from a condition in which the rings 23 are new, and thus not worn, (reference 0 in the graph), it can be seen that a state of wear rapidly leads to a decrease in the load developed by the helical springs 48 for a predetermined engagement travel of the lever linkage controlling the pressure plate 15. On the other hand, the state of wear has little effect on the resilient load determined by the Belleville washer 24.

The advantages of this invention include its considerable axial compactness, its structural simplicity, and the fact that, particularly with the embodiment of FIG. 4, full use can be made of the friction rings of both the first and the second clutches with substantially stable performance of the clutch unit.

Not the least advantage is that the unit of the invention can easily be fitted on engines with conventional flywheels provided for normally engaged double clutches without needing any further specific arrangements. Finally, the use of the unit of the invention improves the safety of the P.T.O. in use, reducing the possibility of accidents in operation.

What is claimed is:

1. A friction clutch unit comprising:

first and second clutches provided with first and second lever linkages, respectively, for the separate engagement and disengagement of two separate driven members with the same driving member, each clutch comprising a clutch disc disposed coaxially between a pressure plate and a friction surface, the first and second lever linkages acting on the pressure plates of the first and second clutches, respectively, the second clutch being of the normally disengaged type with the corresponding pressure plate normally spaced axially from the respective clutch disc by a predetermined clearance, the first and second pressure plates being both disposed between the clutch discs, and the lever linkage of the second clutch acting on the corresponding pressure plate so as to move said pressure plate away from the other pressure plate during the operative engagement of the respective clutch, said friction clutch unit further comprising:

a first and a second resilient engagement load applying system for applying a resilient engagement load to the corresponding pressure plate of the first and second clutch, respectively, said second resilient engagement load applying system including resilient means which are located in a predetermined position between the second lever linkages and the pressure plate of the second clutch.

2. A unit according to claim 1, wherein the first resilient system further comprises a Belleville washer for applying the resilient engagement load to the pressure plate of the first clutch, the Belleville washer acting between the first pressure plate and an auxiliary bell-housing disposed between the pressure plates.

3. A unit according to claim 2, in which the auxiliary bell-housing is formed of pressed sheet metal.

4. A unit according to claim 3, in which the auxiliary bell-housing is monolithic.

5. A unit according to claim 1, wherein the resilient engagement load applied with the second resilient system is derived from the first resilient system, said unit comprising transmission means disposed between the first resilient system and the second lever linkage for deriving said resilient engagement load from said first resilient system.

6. A unit according to claim 5, wherein said second lever linkages comprise a plurality of first-class levers including intermediate portions pivotably mounted on said bell-housing of the unit and said transmission means comprise a corresponding plurality of auxiliary levers including intermediate portions connected to said auxiliary bell-housing, a tie rod acting between one end of each lever and a corresponding end of the respective auxiliary lever.

7. A unit according to claim 6, in which the auxiliary levers act on a radially intermediate portion of the second pressure plate.

8. A unit according to claim 5, in which the second lever linkages comprise a plurality of levers an intermediate portion of each of which is pivotable on an intermediate portion of a link, the link having opposite ends articulated to a bell-housing of the clutch unit and in contact with and bearing on the free end of a strut, respectively, the opposite end of the strut being fixed to the second pressure plate, one end of each lever being connected to the auxiliary bell-housing so as to derive from the Belleville washer of the first resilient system a resilient load constituting the second resilient system.

9. A unit according to claim 1, in which the second lever linkage comprises a strut interposed between the corresponding pressure plate and each control lever of the lever linkage.

10. A unit according to claim 9, in which the second resilient system comprises at least one spring acting between a shoulder of the strut and an abutment of the corresponding pressure plate.

11. A unit according to claim 10 in which the spring is a Belleville washer a radially innermost region of which acts on a radially intermediate portion of the second pressure plate.

12. A unit according to claim 10, in which each strut has means for adjusting the rest position of a corresponding lever for operating the corresponding lever linkage, the means being interposed between the shoulder and the corresponding lever.

13. A unit according to claim 1 in which resilient biasing means act between the pressure plates.

14. A unit according to claim 13 in which the resilient means are engaged on the two pressure plates in angularly offset positions, so as to generate, between the pressure plates an axial component directed along an axis of the clutch unit, and a tangential component perpendicular to the pressure plates and directed perpendicularly to said axis of the clutch unit.

* * * * *